(12) United States Patent
Geltinger et al.

(10) Patent No.: US 8,740,597 B2
(45) Date of Patent: Jun. 3, 2014

(54) BLOW MOULDING MACHINE WITH A STERILE CHAMBER AND STERILE BLOWING AIR FEED

(75) Inventors: Florian Geltinger, Donaustauf (DE); Josef Knott, Walkenstetten/Schierling (DE); Eduard Handschuh, Regensburg (DE)

(73) Assignee: Krones AG, Neutraubling (DE)

( * ) Notice: Subject to any disclaimer, the term of this patent is extended or adjusted under 35 U.S.C. 154(b) by 154 days.

(21) Appl. No.: 13/409,703

(22) Filed: Mar. 1, 2012

(65) Prior Publication Data
US 2012/0225157 A1 Sep. 6, 2012

(30) Foreign Application Priority Data

Mar. 4, 2011 (DE) .......................... 10 2011 013 120

(51) Int. Cl.
B29C 49/46 (2006.01)
B29C 49/58 (2006.01)

(52) U.S. Cl.
USPC .............................. 425/73; 425/522; 425/535

(58) Field of Classification Search
USPC .................................. 425/73, 522, 529, 535
See application file for complete search history.

(56) References Cited

U.S. PATENT DOCUMENTS

| 4,806,401 A * | 2/1989 | Trepus et al. ................ 428/36.1 |
| 6,635,216 B2 | 10/2003 | Dundas et al. |
| 2011/0287126 A1 | 11/2011 | Geltinger et al. |
| 2012/0070522 A1 | 3/2012 | Voth et al. |
| 2012/0177770 A1 * | 7/2012 | Knott et al. ................... 425/535 |

FOREIGN PATENT DOCUMENTS

| EP | 1 271 029 | 5/2002 |
| WO | WO 2010/020529 | 2/2010 |

* cited by examiner

*Primary Examiner* — Robert B Davis
(74) *Attorney, Agent, or Firm* — Greer, Burns & Crain, Ltd.

(57) ABSTRACT

An apparatus for shaping plastic preforms for providing plastic containers), having a plurality of shaping stations arranged on a movable carrier, wherein the shaping stations have blowing molds which accommodate the preforms and within which the preforms are shaped to provide the containers, and wherein the shaping stations each have charging devices which are movable relative to the preforms and which charge the preforms arranged in the molds with a flowable medium for expansion, and wherein the shaping stations have a valve arrangement which controls the feed of the medium to the preforms, with a clean chamber within which the shaping stations are conveyed with the charging devices, wherein the clean chamber is arranged against the surroundings by at least one wall. Flow connections for guiding the flowable medium are provided between the valve arrangements and the charging devices and the valve arrangements are arranged outside the clean chamber.

10 Claims, 10 Drawing Sheets

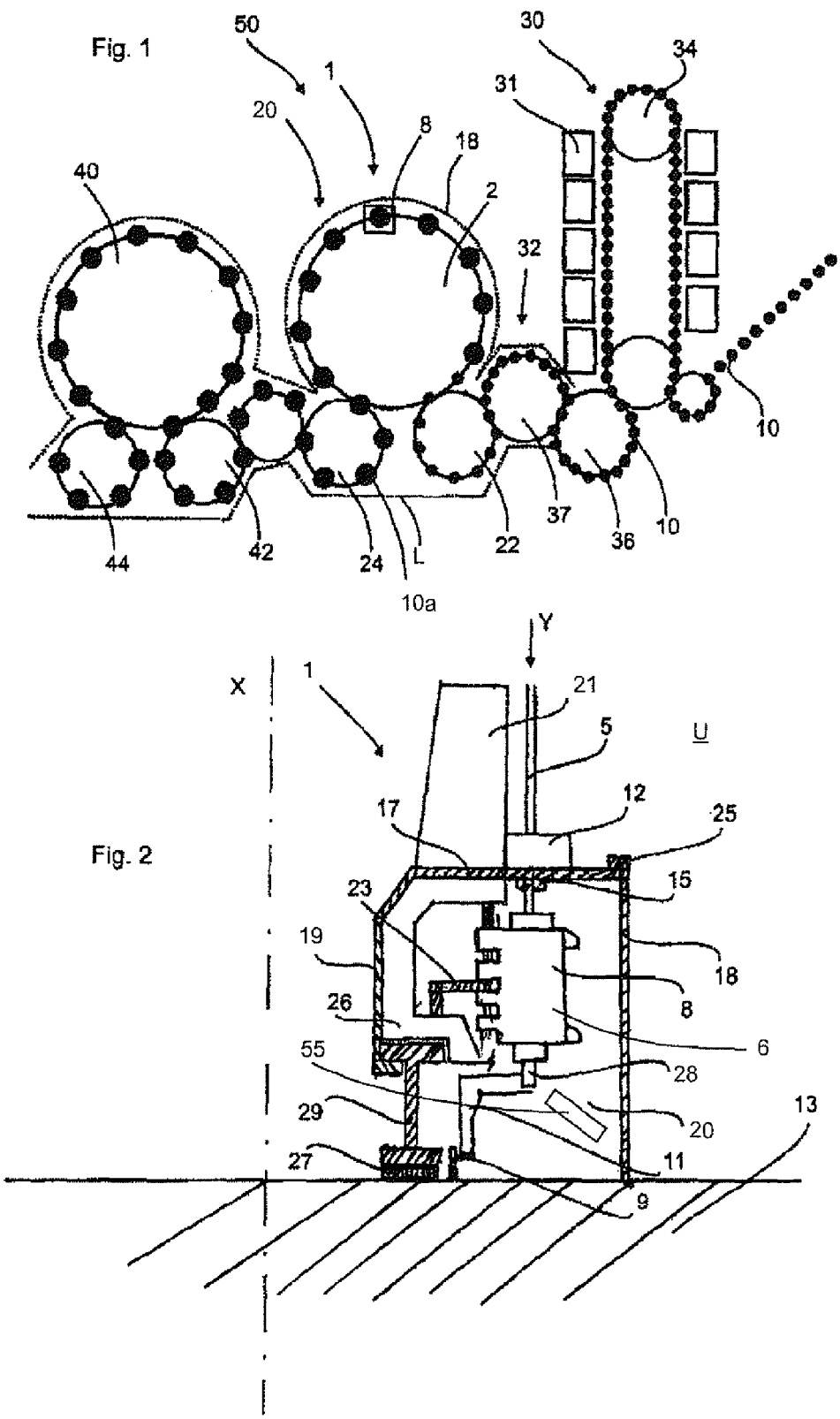

--Prior Art--

BLOW MOULDING MACHINE WITH A STERILE CHAMBER AND STERILE BLOWING AIR FEED

BACKGROUND

The invention relates to an apparatus for shaping preforms of plastic to give containers of plastic. Such apparatuses have been known from the prior art for a long time. In this context, these apparatuses conventionally have a plurality of blow moulding stations, each of which expands the preforms of plastic by charging with air to give containers of plastic by means of blow moulding.

Aseptic blow moulding machines which have a sterile chamber in order to perform the blow moulding operation under sterile conditions in this sterile chamber are furthermore also known from the prior art. Such a blow moulding machine is known from WO 2010/020529 A2. The problem with such aseptic blow moulding machines is the presence of gaps and bearing points in the sterile zone. Germs could bind in these, being protected from destruction during sterilization of the machine (for example by gaseous $H_2O_2$) due to the narrow geometry in the gap.

It would therefore be possible that these germs lead to contamination of the machine and the containers. Such a blow moulding machine, and in particular a stretch blow moulding machine, conventionally has, as mentioned above, a plurality of blow moulding stations in which the preforms are blow moulded to give bottles by application of an internal pressure. EP 1 271 029 B1 describes such an apparatus, which is also called a valve block, for pneumatic control of a blowing pressure for blow moulding of containers. In this context, several embodiments of aseptic valves are also known.

The disclosure content of WO 2010/020529 A2 is herewith included completely in the disclosure content of the present application by reference.

In aseptic blow moulding machines in particular, a sterile pressure medium is advantageously employed for charging the containers. This pressure medium, in particular air, is sterilized with the aid of sterile filters and is then led by pressure lines to the valve block and, where appropriate, further into the container.

SUMMARY

The present invention is therefore based on the object of providing an apparatus which allows feeding of a pressure medium into the containers, without contamination of the sterile pressure medium thereby occurring.

An apparatus according to the invention for shaping preforms of plastic to give containers of plastic has a plurality of shaping stations which are arranged on a movable carrier, wherein the shaping stations each have blowing moulds which serve to accommodate the preforms of plastic and within which the preforms of plastic can be shaped to give the containers of plastic. In this context, the shaping stations each have charging devices which are movable relative to the preforms of plastic and which charge the preforms of plastic arranged in the blowing moulds with a flowable and in particular gaseous medium for expansion thereof. The shaping stations furthermore each have a valve arrangement which controls the feed of the flowable medium to the preforms of plastic, and a clean chamber within which the shaping stations are conveyed with the charging devices, wherein this clean chamber is arranged or sealed off against the surroundings by means of at least one wall.

According to the invention, flow connections for leading the flowable medium are in each case provided between the valve arrangements and the charging devices, and these valve arrangements are arranged at least in regions outside the clean chamber. Advantageously, at least the pilot and triggering valves are arranged at least in regions outside the clean chamber. This means that the said flow connections are arranged in a given region of the flow path of the flowable medium. In this context, these flow connections can extend, for example, directly from the valve arrangements to the blow moulding dies, but it would also be possible for the flow connections to extend from the valve arrangements to blow moulding pistons and for the blowing air to arrive at the blow moulding dies from the blow moulding pistons. The charging devices can preferably also include both blow moulding pistons and blow moulding dies. Preferably, in a working operation (in which shaping of preforms of plastic to give containers of plastic takes place) of the apparatus, the valve arrangements are always arranged outside the clean chamber. The flowable medium is therefore preferably a gaseous medium, and in particular sterilized blowing air for expanding the preforms of plastic. Advantageously, the apparatus therefore also has a sterilizing device for generating sterilized blowing air.

As mentioned above, these valve arrangements are relatively difficult to sterilize, since they have a plurality of valve devices and therefore also a plurality of gaps. It is therefore proposed according to the invention to arrange the valve arrangements (called valve block in the following) outside the clean chamber. These valve arrangements or valve blocks serve, as mentioned above, to control the various pressures. In this context, the valve arrangement preferably comprises a plurality of valves through which the process air is fed from compressed air reservoirs into the preforms of plastic and, where appropriate, is also removed again from the finished shaped containers into the surroundings or back into compressed air tanks. Advantageously, in this context these valve arrangements are arranged in a fixed manner. The carrier is advantageously a rotatable carrier, which is also called a blowing wheel in the following. Advantageously, the apparatus has various reservoirs for holding compressed air, the valve arrangements being supplied from these reservoirs.

The blowing mould can advantageously be opened and closed for the preform of plastic to be fed to it or for the finished shaped container to be removed. Advantageously, the blowing mould is constructed in multiple parts, and particularly preferably the blowing mould parts are arranged on blowing mould carriers.

In a further advantageous embodiment, the apparatus has a stretching rod in order to extend the preforms of plastic in their longitudinal direction. Advantageously, the clean chamber is constructed in the form of a channel around the shaping stations. This means that advantageously certain regions of the apparatus, such as, for example, a shaft for driving the carrier, and/or also certain regions of the carrier are not arranged in the sterile chamber.

In a further advantageous embodiment, one or more guide curves are provided, which control the courses of movement of the individual movable elements of the blow moulding stations, such as, for example, the movements of the blowing mould carrier, the movements of the stretching rod and in particular also the movements of the charging devices. In this context, at least some of these guide curves (if a plurality of guide curves is present) are arranged, and preferably at least in part, outside the clean chamber.

In a further advantageous embodiment, the charging device, which is also called blow moulding die in the following, is arranged such that it is movable relative to the valve arrangement. In other words, the valve arrangement together with the valves is attached in a fixed position and the charging device or the blow moulding piston executes a perpendicular stroke to release constituents of the preforms of plastic, such as, for example, the neck rings of the preforms of plastic. In this context, the process air flows through the valves and the bores in the blow moulding piston into the container, i.e. the preform of plastic.

The charging devices therefore are advantageously movable relative to the preforms of plastic in a longitudinal direction of the preforms of plastic. By this movement, the charging devices can be mounted on the preforms of plastic, and removed from them again after the blow moulding operation. In a further advantageous embodiment, the valve arrangements are immovable relative to the preforms of plastic in the longitudinal direction of the preforms of plastic.

Flow connections are understood in particular as meaning devices which lead or guide a medium, and in particular a gaseous medium, from a first point or region to a second point or region. Advantageously, the flow connection leads the medium in the manner of a circumferentially closed channel.

In a further advantageous embodiment, the flow connections have at least one flexible section. In this context, it is possible for a hose to lead from each of the valve arrangements to the charging devices or blow moulding pistons, but it would also be conceivable for only a section of the flow connection leading from the valve arrangement to the charging device to be flexible in construction. In the variant with a hose described here, the process air is fed through a flexible hose of plastic, which is explained in detail below.

In this context, as mentioned, the valve block or the valve arrangement is attached to the carrier in a fixed position and the blow moulding piston together with the charging device executes a perpendicular stroke to release the neck of the preform of plastic. Advantageously, in this context the hose has a very smooth internal surface which offers no foothold for germs. Preferably, in this context the internal surface of the hose is coated in a lotus flower-like manner. Advantageously, the particular connection points with which the hose is arranged on the valve arrangement and/or the charging device are also hygienically constructed and have no gaps in which germs can multiply.

Advantageously, the flow connection is flexible at least in the longitudinal direction of the containers or in the direction of the relative movement between the preform of plastic and the charging device. This flexibility can be achieved, for example, by a bending of the flow connection.

Advantageously, in this embodiment the flow connection therefore has a flexible hose. In this context, this flexible hose advantageously passes a boundary between the clean chamber and the surroundings. Thus, for example, the hose can extend through a wall which separates the clean chamber from the surroundings.

In an advantageous embodiment, the flexible hose has an inner hose and a jacket body surrounding this inner hose. In this context, this inner hose can be produced from, for example, an elastic material, such as PTFE, and the jacket body surrounding this hose can be constructed, for example, as a steel braid. By this design, the hose can nevertheless accommodate high pressures of up to 40 bar or more.

The applicant reserves the right also to claim the hose described here independently of the apparatus.

In this context, in these embodiments the apparatus has a flexible connection preferably including a seal between the valve arrangement and the charging device. In this context, this flexible connection also advantageously represents a separation between the sterile chamber and the surroundings.

It is ensured in this manner that on release of the necks of the preforms of plastic the sterile chamber is at no time in contact with the surroundings. Preferably, at least sections or zones of the flow connection are produced from a flexible material.

When the charging device or blow moulding die adjoins the preform of plastic, a membrane mounting advantageously offers a contact surface for a rolling membrane, so that this can be charged with the process air. In a further advantageous embodiment, when connected with further elements the inner hose also serves as a sealing surface. In this manner an aseptic connection can be made between a fixed valve block and the charging device by means of a hose of plastic sheathed in metal.

Thus, for example, the inner hose can have a flanged inner hose which also serves for connection with other bodies. As mentioned, the inner hose can then be made of a plastic, such as, for example, PTFE. The hose of plastic furthermore advantageously has, especially in the end section, a sheath into which the elastic inner hose is inserted. In this context, the internal wall of this hose of plastic which comes into contact with the pressure medium can project into a flange facing and be connected in a fixed manner with other connection points by this flange facing. Advantageously, the flexible section of the hose is therefore arranged at least in sections and in part in a pressure-resistant sheath. An additional seal, in particular an O ring, is furthermore advantageously mounted in the region of the flange facing.

In a further advantageous embodiment, the flow connection has a rolling membrane. The flow connection can thus have a flexible section of this rolling membrane, this rolling membrane in particular also allowing a relative movement between the charging device and the valve arrangement. In other words, it is possible to mount the said rolling membrane such that when the charging device is raised the sterile chamber remains separated from the surroundings.

In a lower position in which the charging device can adjoin the support ring of the preform of plastic, this rolling membrane can be supported, for example, by means of its entire outer surface and can be charged with process air on one side in this way without problems, that is to say without risking damage. When the blow moulding piston, that is to say the charging device, performs the stroke upwards, the rolling membrane is not charged with air and therefore is not at risk. In order to allow the rolling membrane to adjoin the contact surface completely, the height of the membrane mounting on the blow moulding piston is advantageously adjustable. The rolling membrane or generally the movable membrane is advantageously arranged opposite a body surrounding this rolling membrane.

It is furthermore possible, for example, for the charging device to wrap over the neck of the preform of plastic. However, it would also be possible for the charging device to adjoin an upper edge of the preform of plastic or the thread thereof during the charging of the preform with compressed air.

Preferably, when under a pressure load the rolling membrane is therefore arranged on a sheath surrounding the rolling membrane.

BRIEF DESCRIPTION OF THE DRAWINGS

Further forms and embodiments can be seen from the attached drawings. In these:

FIG. 1 shows a diagrammatic representation of an installation for production of containers of plastic;

FIG. 2 shows a view of a clean chamber in the region of a shaping station;

DETAILED DESCRIPTION

Figure 3:
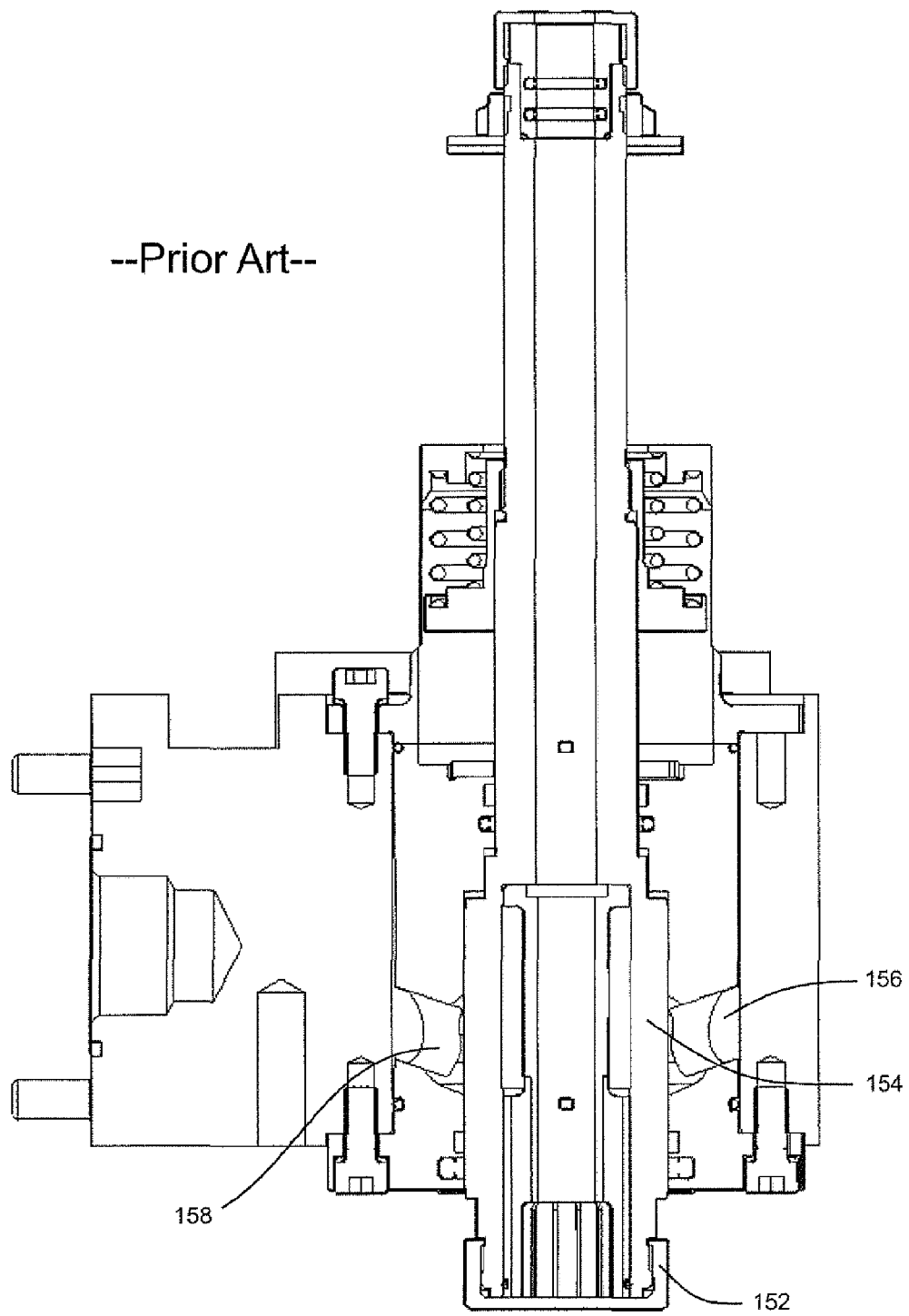
FIG. 3 shows a representation of a pressure charging unit according to the prior art.

FIG. 1 shows a diagrammatic representation of an installation for production of containers of plastic. This installation 50 has a heating device 30 in which preforms of plastic 10 are heated. These preforms of plastic 10 here are led by means of a conveying device 34, such as here a circulating chain, through this heating device 30 and are thereby heated with a plurality of heating elements 31. This heating device 30 is followed by a transfer unit 36 which transfers the preforms 10 to a sterilization device 32. This sterilization device 32 here likewise has a conveying wheel 37 and sterilization elements can be arranged on this conveying wheel 37, or also in a stationary manner. In this region, for example, sterilization by hydrogen peroxide gas or also by electromagnetic radiation is possible. In particular, an internal sterilization of the preforms is carried out in this region.

Reference symbol 20 designates a clean chamber in its entirety, the outer boundaries of which are indicated here by the dotted line L. It can be seen that this clean chamber 20 starts in the region of the sterilization unit 32. Lock devices can be provided in this region in order to introduce the preforms of plastic into the clean chamber 20 without too much gas thereby being lost within the clean chamber.

As indicated by the broken line L, the clean chamber is adapted to the outer shape of the individual components of the installation. The volume of the clean chamber can be reduced in this manner.

Reference symbol 1 designates a shaping apparatus in its entirety, in which a plurality of blow moulding stations or shaping stations 8 is arranged on a conveying wheel, only one of these blow moulding stations 8 being shown here. The preforms of plastic 10 are expanded into containers 10a with these blow moulding stations 8. Although not shown here in detail, the entire region of the conveying device 2 is not within the clean chamber 20, but the clean chamber 20 or isolator is realized to a certain extent as a mini-isolator within the entire apparatus. It would thus be possible for the clean chamber to be of channel-like construction at least in the region of the shaping apparatus 1.

Reference symbol 22 refers to a feed device which transfers the preforms to the shaping device 1, and reference symbol 24 refers to a removal device which removes the containers of plastic 20 produced from the shaping apparatus 1. It can be seen that the clean chamber 20 has recesses in each case in the region of the feed device 22 and the removal device 24, which accommodate these devices 22, 24. In this manner, a transfer of the preforms of plastic 10 to the shaping apparatus 1 or a taking over of the containers of plastic 10a from the shaping apparatus 1 can be achieved in a particularly advantageous manner.

The expanded containers of plastic are transferred to a filling device 40 with a transfer unit 42, and are then removed from this filling device 40 via a further conveying unit 44. The filling device 40 here is also within the said clean chamber 20. In the case of the filling device also, it would be possible for the entire filling device 40 with, for example, a reservoir for a drink not to be arranged completely within the clean chamber 20, but here also only those regions in which the containers are actually led. In this respect, the filling device could also be constructed in a similar manner to the apparatus 1 for shaping preforms of plastic 10.

As mentioned, the clean chamber 20 is reduced to a smallest possible region in the region of the apparatus 1, namely essentially to the blow moulding stations 8 themselves. Due to this small construction design of the clean chamber 20 it is possible for a clean chamber to be produced altogether more easily and faster, and maintaining sterile conditions in the operating phase requires less outlay. Also, less sterile air is needed, which leads to smaller filter installations and the risk of uncontrolled eddy formation is also reduced.

FIG. 2 shows a detailed representation of the apparatus 1 in the region of a blow moulding station 8. A plurality of such blow moulding stations 8 is moved in rotation around an axis X with a conveying device 2 or a carrier. The blow moulding station 8, as can be seen in FIG. 2, is led within the clean chamber 20, which is of channel-like construction here. This clean chamber 20 is closed off by a movable side wall 19 and a cover 17 constructed as one part with this side wall 19. This side wall 19 and the cover 17 here rotate together with the blow moulding station 8.

Reference symbol 18 refers to a further wall which bounds the clean chamber 20. This wall 18 here is an outside wall which is arranged in a stationary manner. Between the cover 17 and the wall 18 a sealing device 25 is provided, which seals off from one another the elements 17 and 18 which are movable relative to one another, for example, as mentioned above, using a water lock. The lower region of the wall 18 is arranged in a fixed and sealed-off manner on a base 13. Within the clean chamber 20 and here directly adjoining the wall 19 a carrier 26 is provided, which likewise moves in rotation and on which in turn a holding device 23 which holds the blow moulding station 8 is provided.

Reference symbol 11 refers to a secondary device which can be actuated by a guide curve 9 in order to open and to close the blow moulding station on its path through the clean chamber 20, in order in particular to insert the preform of plastic into the blow moulding station and in order also to remove it again. A guide curve 9 here is also arranged within the clean chamber 20. However, it would also be possible, for example, for just a section 11 already to lead out of the clean chamber 20 below the individual blow moulding stations 8.

The conveying device 2 can have still further elements which are arranged above the clean chamber 20.

The carrier 26 here is arranged in a fixed manner on a holding body 29, and this holding body in turn is movable relative to the base 13. Reference symbol 27 here refers to a further sealing device which also effects, in this region, sealing of the regions 13 and 29 which are movable relative to one another.

Reference symbol 5 refers to a stretching rod which is movable relative to the blow moulding station, in order to stretch the preforms of plastic 10 in their longitudinal direction. A slide 12 here, relative to which the stretching rod is movable in the direction Y, is arranged on the cover 17 here.

Reference symbol 21 refers to a further holding means for this slide 12 of the stretching rod 5.

It can be seen that certain regions of the stretching rod are both outside the clean chamber 20 and within the clean chamber 20 during the blow moulding operation. For this purpose, it is possible for a protective device, such as a folding bellows, which surrounds the stretching rod 5 to be provided outside the clean chamber 20 or above the slide 12, so that no region of the stretching rod 5 comes directly into contact with the outside surroundings. Reference symbol U identifies the (non-sterile) surroundings of the clean chamber 20. Reference symbol 28 identifies a carrier for carrying a base form, which is likewise a constituent of the blowing mould. This carrier likewise can be moved here in the direction Y.

Reference symbol 55 refers to a sterilization device, which here is preferably arranged inside the clean chamber 20 and serves to sterilize the individual shaping stations or constituents of these shaping stations 8. This sterilization device 55 here can charge the shaping stations 8, for example, with hydrogen peroxide or another sterilization agent. The sterilization device 55 here can be arranged in a stationary manner, and the shaping stations can move relative to this sterilization device 55.

The blowing moulds (not shown) are arranged within the blowing mould carrier 6. More precisely, two blowing mould carrier parts which are swivellable relative to one another and which each hold a blowing mould part can be arranged here. By this swiveling operation, the blowing moulds can be opened for introduction of preforms of plastic and for removal of finished blow moulded containers. These blowing mould carriers and blowing moulds here are likewise arranged within the clean chamber.

FIG. 3 shows an arrangement according to the prior art for charging preforms of plastic with blowing air. A charging device 152 is provided here, which can be applied to an opening of a preform of plastic (not shown) in order to expand this. Reference symbol 156 identifies a feed for feeding blowing air and reference symbol 158 identifies a corresponding opening for removing the blowing air.

The blow moulding piston 154 moves here relative to the valve block. It can be seen that a plurality of bores and gaps is present for this arrangement, as a result of which the arrangement shown in FIG. 3 is not suitable for aseptic arrangements.

Figure 4:
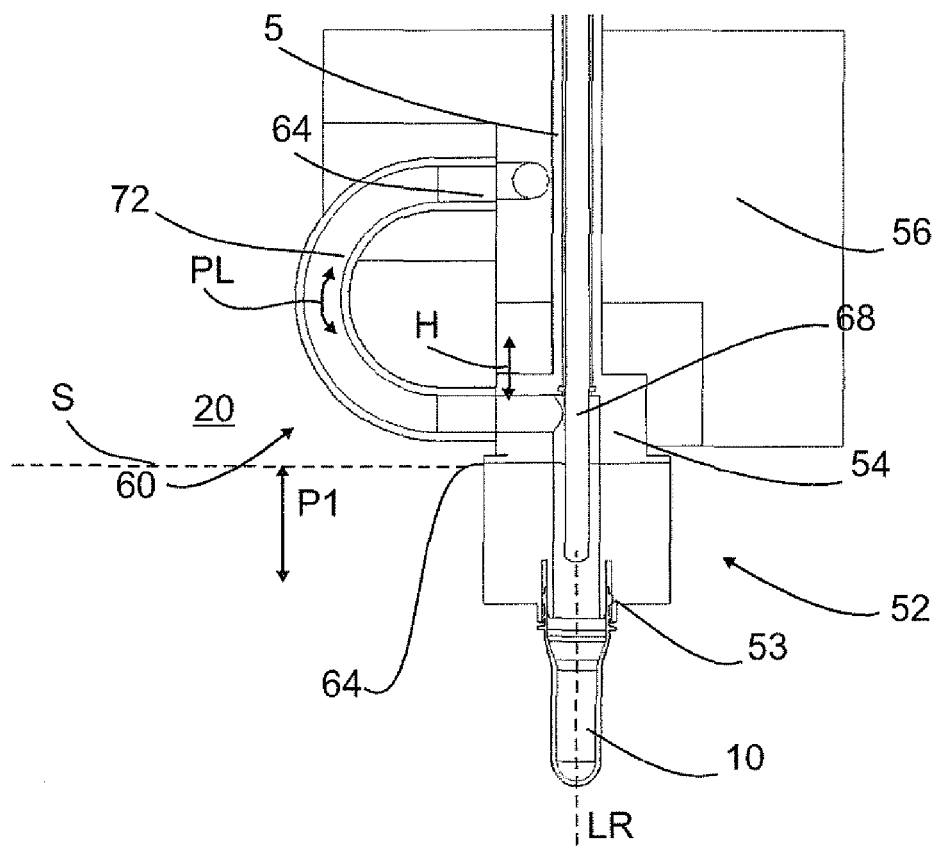
FIG. 4 shows a first embodiment of a pressure charging device according to the invention.

FIG. 4 shows an embodiment according to the invention of an arrangement for charging preforms of plastic 10 by means of blowing air. Here also a charging device 52 which can be applied to the opening of the preforms of plastic 10 is provided. In contrast to the embodiment shown in FIG. 3, however, a flexible flow connection 72 for conveying the process air PL or blowing air is provided here, which is arranged via two connecting points 64, one on a blow moulding piston 54 and one on the valve block 56. All the streams of blowing air, both those which arrive at the preform of plastic 10 from the valve block 56 and those which arrive back again at the valve block 56 or the valve arrangement 56, can pass through this flow connection constructed here as a hose.

Reference symbol H identifies the stroke of the blow moulding piston 54 towards the valve arrangement 56. The blow moulding piston 54 is a constituent of the charging device 52 here. Reference symbol 68 identifies a pneumatic seal which is arranged here within the blow moulding piston. The stretching rod 5 which effects an extension of the preform of plastic can furthermore also be seen, this stretching rod 5 here being led through the blow moulding piston. The blow moulding piston 54 therefore moves in the direction shown by the arrow P1 in FIG. 4. Reference symbol LR identifies the longitudinal direction of the preforms of plastic.

Reference symbol 20 refers again to the sterile chamber and the broken line S identifies the sterile chamber boundary. In other words, there are sterile conditions within the flow connection 60 or the hose 72 and in part non-sterile conditions outside this connection device. Preferably, the flow connection 60 or hose 72 extends through the sterile chamber boundary.

Reference symbol 53 refers to a blow moulding die which is a constituent of the charging device 52. This blow moulding die 53 here can be applied to a region of the opening of the preform of plastic in order thereafter to charge this with the gaseous medium.

Figure 5:
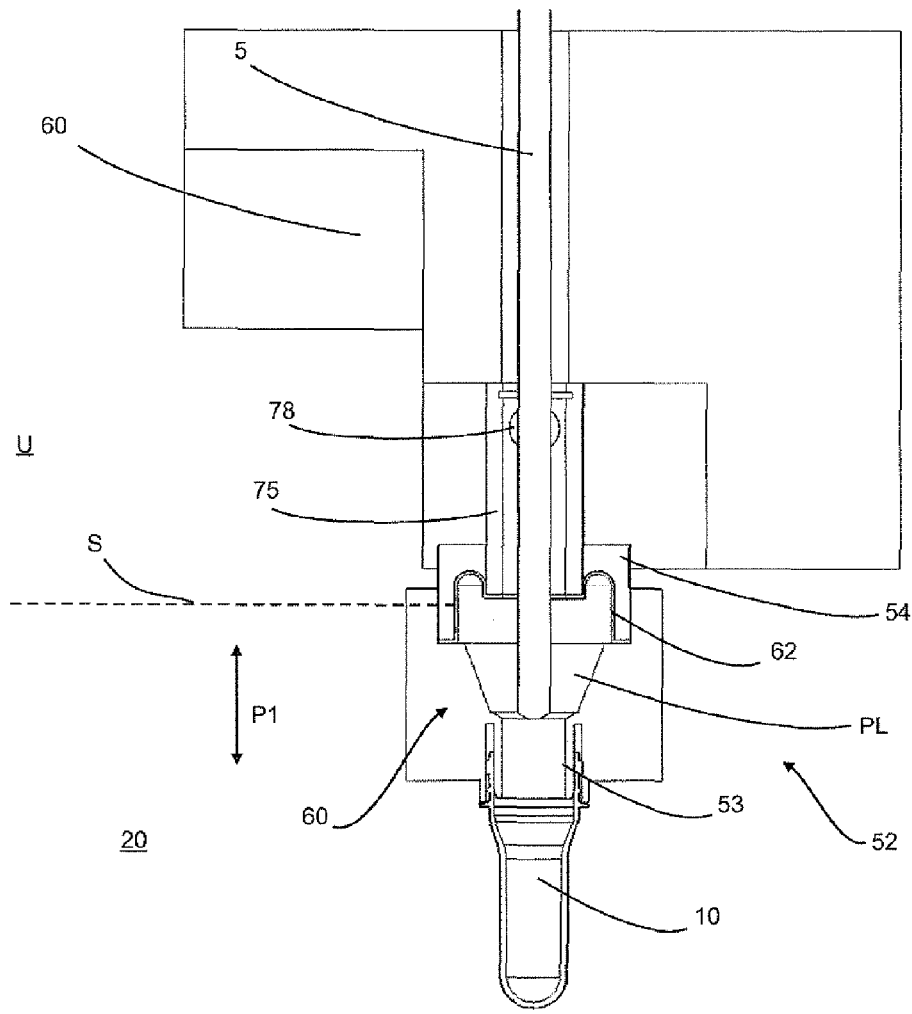
FIG. 5 shows a further embodiment of a pressure charging device according to the invention with a blow moulding die positioned on a preform of plastic.

FIG. 5 shows a further embodiment according to the invention for expanding preforms of plastic 10. A charging device 52 or blow moulding die 53 which can be applied to the preform of plastic 10 is likewise again provided. However, between the valve block 56 and the blow moulding piston 54 which is movable relative to this valve block 56 along the arrow P1 a rolling membrane 62 is provided here, which forms a section of the flow connection 60 for the blowing air. This rolling membrane here has the effect in particular of a flexibility in the direction of the stroke of the charging device.

FIG. 5 shows the position in which the charging device 52 adjoins the opening of the preform. In this case a fixed guide 75 or guide sheath which is movable relative to the blow moulding piston 54 is arranged here. In the situation shown in FIG. 5, the blow moulding piston 54 is in its lowest position and the rolling membrane 62 adjoins the internal wall of the blow moulding piston 54 in a flat manner. If charging with compressed air now takes place, the rolling membrane 62 is merely pushed by this means into the internal wall of the blow moulding piston 54 and cannot be damaged as a result.

Figure 6:
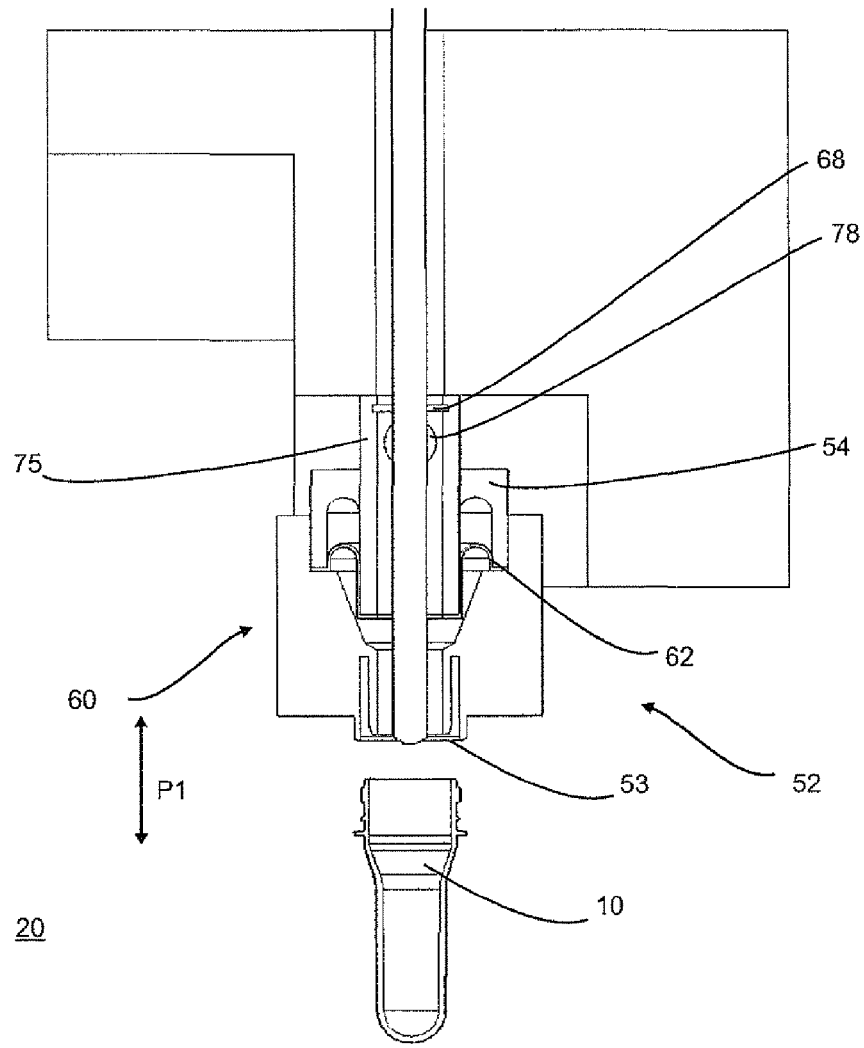
FIG. 6 shows the representation from FIG. 5 with the blow moulding die removed from the preform of plastic.

In the position shown in FIG. 6, the blow moulding piston 54, together with the charging device 52, is in the upper position and therefore, as shown, is at a distance from the preform of plastic 10. In this situation the rolling membrane 62 is indeed at a distance from the internal wall of the blow moulding piston 54, but is also not charged with compressed air.

Reference symbol 68 here also again identifies a pneumatic seal, and reference symbol 78 an opening for feeding compressed air. In the embodiment shown in FIG. 5, as shown, the charging device 52 wraps over the neck of the preform of plastic. Reference symbol PL in turn identifies the process air.

Figure 7:
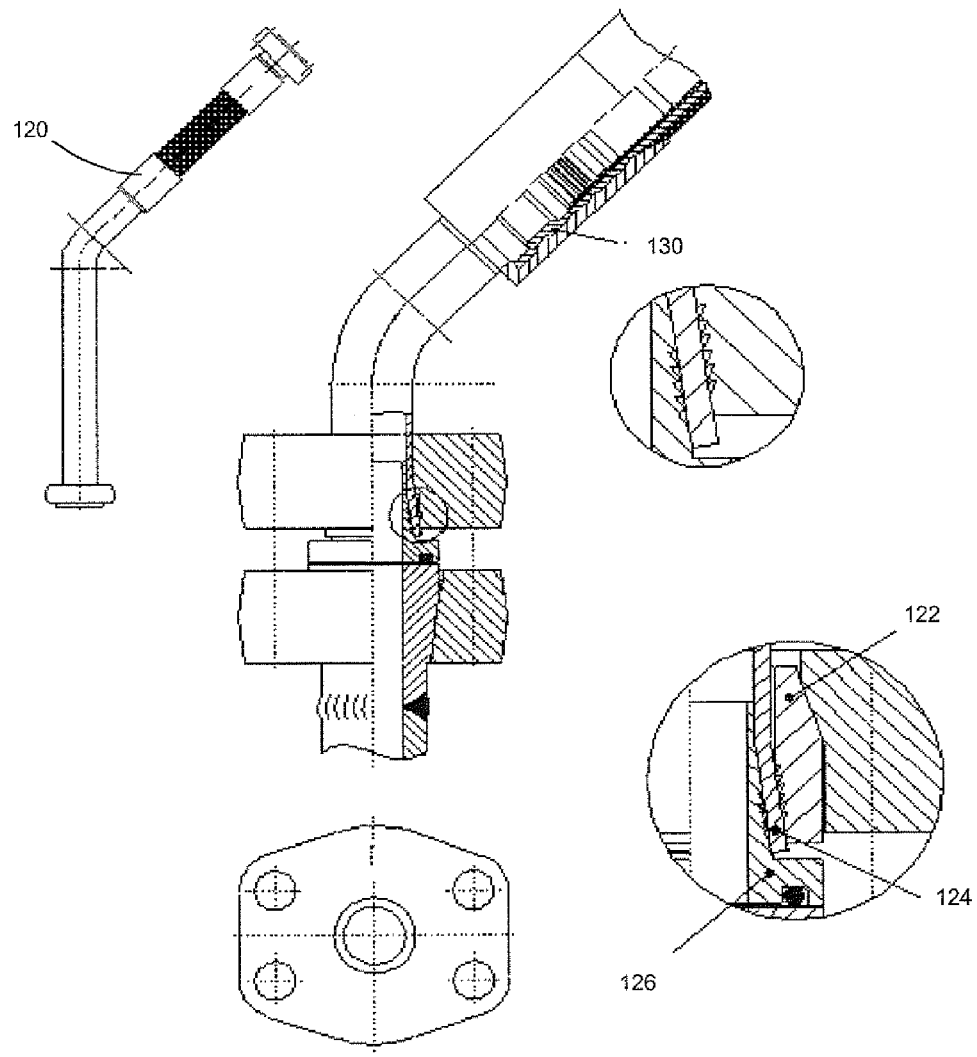
FIG. 7 shows a representation of a hose connection according to the prior art.

FIG. 7 shows a hose arrangement 120 according to the prior art. A total of 5 part figures of such a hose are shown here. It can be seen in particular from the right-hand lower part figure that in particular in the region of a retaining device 130 and a clamping ring 122 and of a collar ring 126 and a hose nipple 124 a plurality of gaps arises, which are difficult to sterilize, or in which germs can settle.

Figure 8:
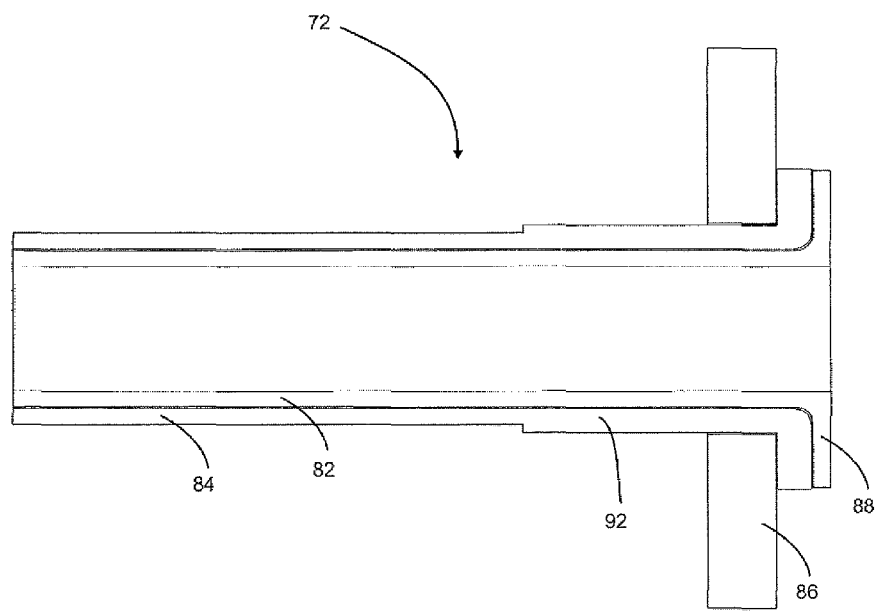
FIG. 8 shows a hose connection according to the invention.

FIG. 8 accordingly shows an embodiment of a hose 72 according to the invention. It is pointed out that the hose connection described here may also be claimed independently of the subject matter of the independent claim. The applicant reserves the right to claim independently the hose arrangement described here.

The embodiment shown in FIG. 5-6 can also be used independently of aseptic uses or the presence of a clean chamber. The hose connection here has a inner flexible hose 82 and a sheathing 84 which surrounds this hose 82. An end section of this inner hose 82 projects out such that it can be flanged, in order to establish a connection with further elements in this manner.

The hose arrangement 72 shown in FIG. 8 is provided in particular for the aseptic uses which are essential here. The inner hose 82 here, as mentioned above, is made of, for example, PTFE. The hose 72 of plastic can be employed for process air in the pressure range of from 0 to 40 bar, preferably from 8 to 40 bar. The PTFE hose 82 preferably has a corrugated external surface, particularly preferably a smooth or polished internal surface. The inner hose 82 furthermore is preferably flanged on the outside, so that such hoses can be joined to one another or with other components hygienically, that is to say without gaps.

In order to be able to withstand the high pressure of the process air, the hose 82 is preferably sheathed with the steel braid 84, this advantageously being a high grade steel braid. Reference symbol 92 refers to a collar with a pressed sheath, which is advantageously present in order to establish a secure connection between the hose 82 and the sheathing 84. Furthermore, this collar 92 is advantageously screwed on by means of a thread and the sheathing 84 is secured by a pressed sheath on the collar 92. Reference symbol 86 identifies a flange which can be joined, for example, to the further flange of a further hose piece or, for example, to a housing. The hose 72 therefore has aseptic or hygienic connection points both with one another and to other components. The end section 88 of the hose 82 therefore preferably projects, as stated, into the region of the facing of the flange 86 or beyond it and therefore at the same time assumes there a sealing function to a connected part.

Figure 9:
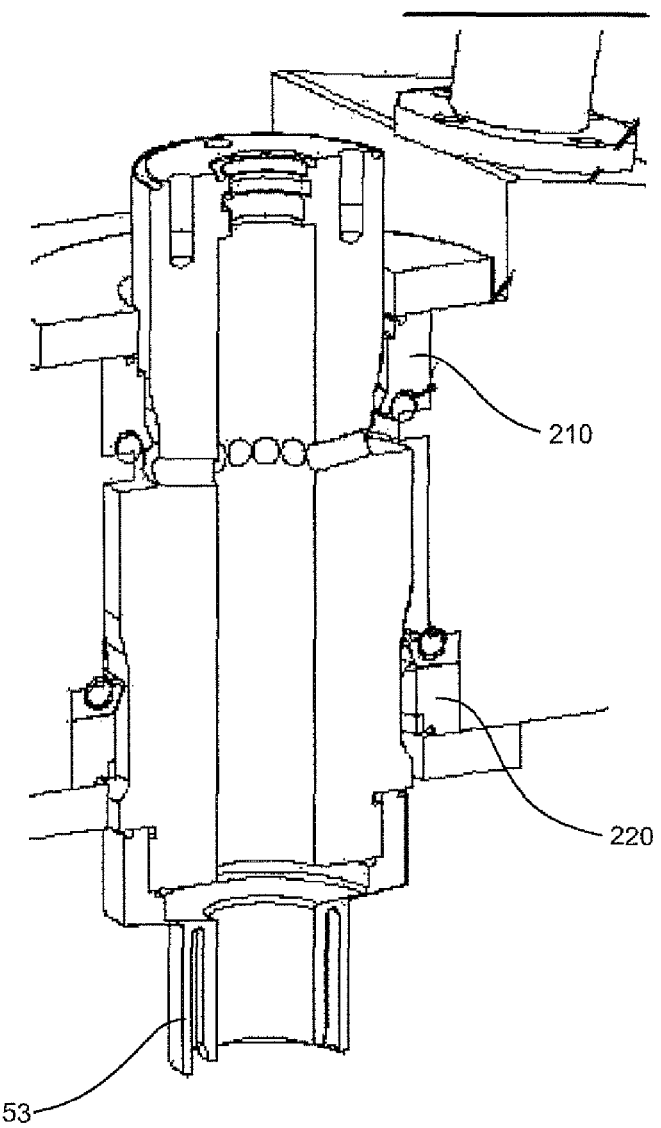
FIG. 9 shows a further representation of a blow moulding die arrangement.

FIG. 9 shows a representation to illustrate sealing of the charging device or the blow moulding die arrangement with respect to the sterile chamber boundaries. There are provided here a first (upper) sealing device 210 preferably arranged in a stationary manner and a second (lower) sealing device 220 likewise arranged preferably in a stationary manner in the direction L. These sealing devices 210, 220 here advantageously assume both a sealing function for the blow moulding die arrangement and a guide function. That means that especially the second sealing device 220 preferably assumes also a guide function for guiding the blow moulding piston 54 (see FIG. 11a). In other words, the guide element here is combined with the sealing element. That means that the sealing devices 210, 220 therefore preferably can be formed as a rod seal (fixed) and/or as a piston seal (moveable). Such combined guide and sealing devices 210, 220 here can be constructed both as one part and in several parts. Advantageously by such a combination of guide and sealing devices 210, 220 no more hose is needed for the guidance of the fluid medium and/or high pressure air, since the fluid medium, which is for example sterile air, is brought in directly into the valve block or the valve arrangement 56, respectively, (see FIG. 11a) and therefore especially from above to the sealing device 220 and from there to the inside of the blow moulding piston 54. Thereby the valve block or the valve arrangement 56, respectively is formed unmovable or fixed, respectively, and especially arranged at an upper end or area of the sealing device 220, so that advantageously the blow moulding piston 54 can be pushed into the valve block or the valve arrangement 56, respectively.

Preferably the sealing device 220 (and/or the sealing device 210) is surrounded especially at their lower side or area and/or at their upper side or area by sterile air and also by low pressure air, wherein however essentially unsterile ambient air borders especially at the lateral and/or rear areas of the sealing device 220.

That means that therefore especially three different pressures are applied to the sealing device 220.

Therefore the sealing device 220 and/or the sealing device 210 are attainable with an appropriate sterilisation medium from the high-pressure-subjected side and also from the not-high-pressure-subjected side.

In this context, it is possible that the rear regions, i.e. those facing away from the clean chamber (i.e. the dead spaces), of the sealing and guide elements 210, 220, due to for example of a defined formed contour of the guide and sealing devices 210 are sealed off from the clean chamber such that no exchange of the sterile blowing air or of the sterile air with these rear regions is possible. Preferably also the arrangement of an o-ring (explain in more detail below) arranged inside a contour between the guide and sealing devices 210, 220 and the housing (not shown) serves to seal the rear areas accordingly.

Preferably the guide and sealing devices 210, 220 consist of at least partially or proportionally plastic material, like for example PEEK (Polyetheretherketone) or PTFE (Polytetrafluorethylene) or mixtures thereof.

Figure 10:
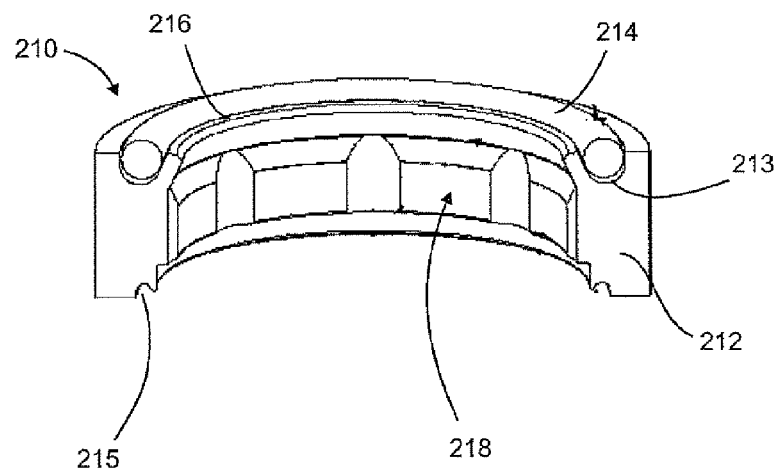
FIG. 10 shows a representation of a sealing device.

FIG. 10 shows a detailed representation of such a sealing device. This has a base body 212 with a sealing lip 216 arranged on this, in particular flexibly. An O ring 214 is arranged in a recess 213. This O ring serves on the one hand to effect pretensioning of the sealing lip radially inwards, i.e. towards the blow moulding die arrangement. On the other hand, this O ring 214 also effects a hygienic edge seal.

Reference symbol 218 identifies a slotted guide element which is arranged on the inside of the sealing device 210. This slotted embodiment has the effect that a sterilization gas can enter into the undercuts or intermediate spaces more easily. The guide surface or the guide element 218 is therefore preferably provided with one or more slots. Reference symbol 215 refers to a (peripheral) recess into which, for example, a further (in particular hygienic) O ring can be inserted.

Figure 11A:
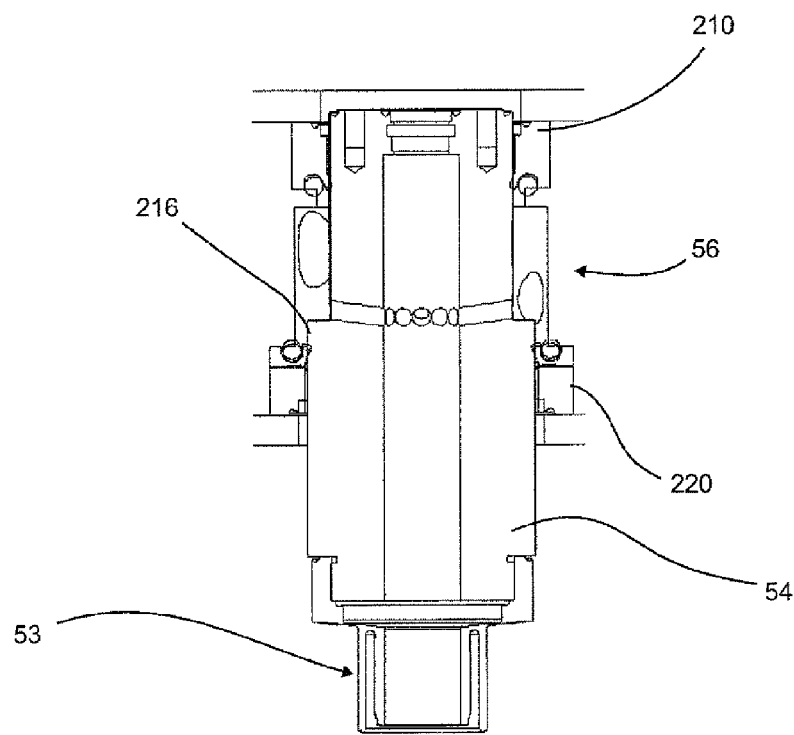
FIG. 11a-11c shows three representations to illustrate the sealing of the blow moulding die.
Figure 11B:
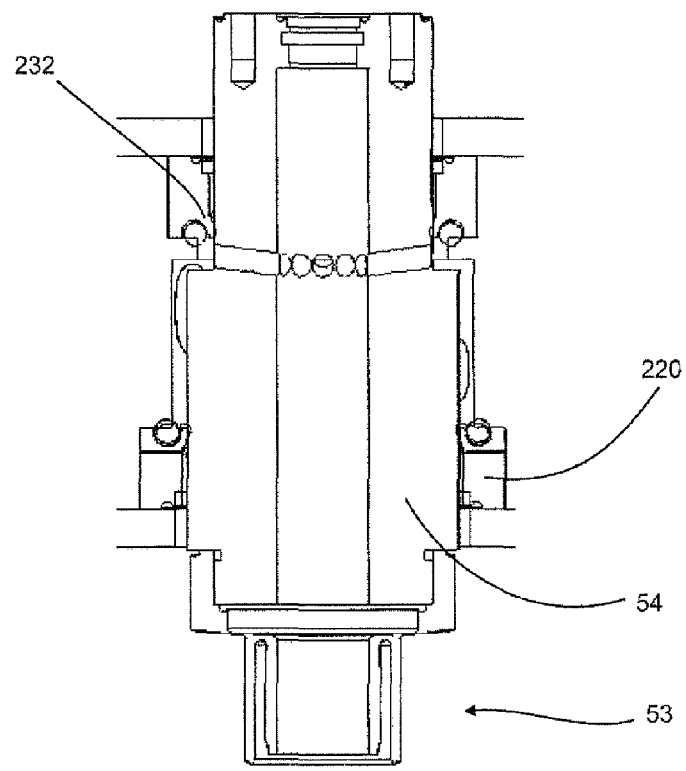
Figure 11C:
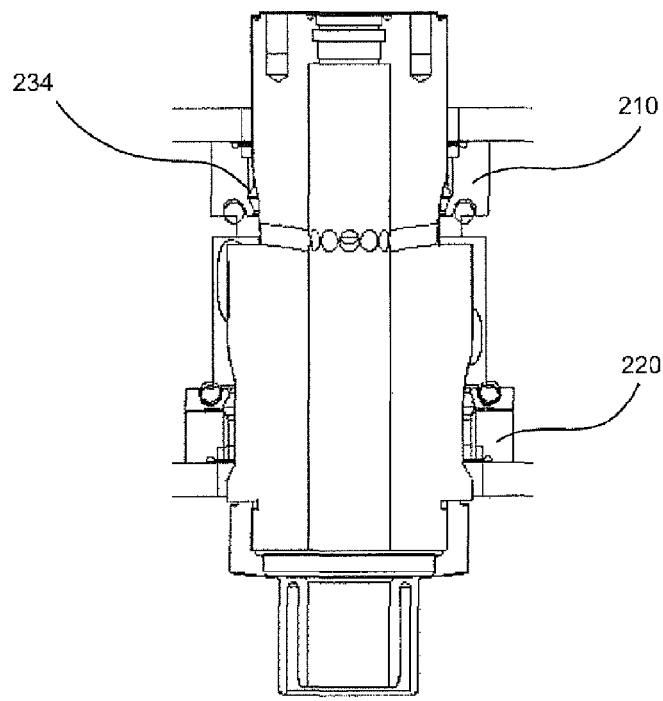

FIGS. 11a-11c show possible positions of a blow moulding die. In the representation shown in FIG. 11a, the blow moulding die is in a lower position (in which charging of the preforms of plastic is possible). The sealing lips 216 which adjoin the blow moulding piston 54 or the valve block 56 can be seen again here.

In the representations shown in FIG. 11b and 11c, the blow moulding die 53 is in an upper position. In the embodiment shown in FIG. 11b, the blow moulding piston 54 has a straight-line course 232 on its outer circumference. In the embodiment shown in FIG. 11c, a tapering 234 (running from the top downwards) is provided on the outer circumference of the blow moulding piston 54. This tapering on the blow moulding piston 54 likewise contributes towards better diffusion of the sterilization gas.

The hygienic O rings can advantageously be pretensioned on the particular edges of the sealing devices 210, 220 such that no (flow) connection with the non-sterile space can arise.

The applicant reserves the right to claim all the features disclosed in the application text as essential to the invention where they are, individually or in combination, novel with respect to the prior art.

The invention claimed is:

1. An apparatus for shaping preforms of plastic for providing containers of plastic, comprising: a plurality of shaping stations which are arranged on a movable carrier, wherein the shaping stations each have blowing moulds which serve to accommodate the preforms of plastic and within which the preforms of plastic can be shaped to give the containers of plastic, and wherein the shaping stations each have charging devices which are movable relative to the preforms of plastic and which charge the preforms of plastic arranged in the blowing moulds with a flowable medium for expansion thereof, and wherein the shaping stations each have a valve arrangement which controls the feed of the flowable medium to the preforms of plastic, with a clean chamber within which the shaping stations are conveyed with the charging devices, wherein this clean chamber is arranged against the surroundings outside the clean chamber by means of at least one wall, and flow connections for leading the flowable medium are in each case provided between the valve arrangements and the charging devices and the valve arrangements are arranged at least in regions outside the clean chamber.

2. The apparatus according to claim 1,
characterized in that
the charging devices are movable relative to the preforms of plastic in a longitudinal direction of the preforms of plastic.

3. The apparatus according to claim 1,
characterized in that
the valve arrangements are immovable relative to the preforms of plastic in the longitudinal direction of the preforms of plastic.

4. The apparatus according to claim 1,
characterized in that
the flow connection has at least one flexible section.

5. The apparatus according to claim 1,
characterized in that
the flow connection has a flexible hose.

6. The apparatus according to claim 5,
characterized in that
the flexible hose has an inner hose and a jacket body surrounding this inner hose.

7. The apparatus according to claim 6,
characterized in that
the inner hose also serves as a sealing surface when connected to further elements.

8. The apparatus according to claim 1,
characterized in that
the flow connection has a sealing element or separating element.

9. The apparatus according to claim 8,
characterized in that
the flow connection has a rolling membrane.

10. The apparatus according to claim 9,
characterized in that
when under a pressure load, the rolling membrane is arranged in a sheath surrounding the rolling membrane.

\* \* \* \* \*